United States Patent [19]

Gallup et al.

[11] Patent Number: 5,032,284
[45] Date of Patent: Jul. 16, 1991

[54] PROCESS FOR TREATING AMMONIA AND NITRITE CONTAINING WATERS TO PREVENT NITRIC OXIDE EMISSIONS THEREFROM

[75] Inventors: Darrell L. Gallup, Chino Hills; John L. Featherstone, El Centro, both of Calif.

[73] Assignee: Union Oil Company of California, Los Angeles, Calif.

[21] Appl. No.: 345,177

[22] Filed: May 1, 1989

[51] Int. Cl.$^5$ .................................... C02F 1/72
[52] U.S. Cl. .................................. 210/697; 60/641.2; 60/912; 210/752; 210/753; 210/754; 210/758; 210/764; 210/903; 210/747; 423/237; 423/DIG. 19
[58] Field of Search .............. 60/641.2-641.5, 60/690, 692, 912; 210/697, 747, 752, 754, 755, 758, 764, 759, 753, 903; 423/235, 237, 239, DIG. 19; 422/18; 55/70

[56] References Cited

U.S. PATENT DOCUMENTS

| 3,985,523 | 10/1976 | Kaupas et al. | 55/70 |
|---|---|---|---|
| 4,426,364 | 1/1984 | Cooper | 423/235 |
| 4,448,899 | 5/1984 | Haas | 423/235 |
| 4,455,287 | 6/1984 | Primack et al. | 210/764 |
| 4,498,921 | 2/1985 | Wojtowicz | 210/764 |
| 4,673,509 | 6/1987 | Davis et al. | 210/755 |
| 4,698,165 | 10/1987 | Theyson | 210/755 |
| 4,731,231 | 3/1988 | Perry | 423/235 |
| 4,778,665 | 10/1988 | Krishnamurthy et al. | 423/235 |
| 4,830,766 | 5/1989 | Gallup et al. | 60/641.5 |
| 4,844,162 | 7/1989 | Massen et al. | 60/641.2 |
| 4,869,066 | 9/1989 | Pye et al. | 210/747 |
| 4,874,529 | 10/1989 | Featherstone et al. | 210/747 |
| 4,886,650 | 12/1989 | Perry | 423/235 |

FOREIGN PATENT DOCUMENTS

| 54-28771 | 3/1979 | Japan | 423/239 |
|---|---|---|---|
| 5499345 | 8/1979 | Japan | 210/903 |
| 55-51420 | 4/1980 | Japan | 55/70 |

Primary Examiner—Robert A. Dawson
Assistant Examiner—Joseph Drodge
Attorney, Agent, or Firm—Clark E. De Larvin; Gregory F. Wirzbicki

[57] ABSTRACT

A process is provided for controlling the emission of nitrogen dioxide from, and the growth of living organisms in, steam condensate cooling towers and catch basins used in conjunction with steam and condensate of steam derived from ammonia and geothermal brine containing dissolved iron. The process comprises contacting the condensate, in a substantially continuous manner, with a small, substantially less-than-stoichiometric amount of an oxidizing biocide, such as trichloroisocyanuric acid or 1-bromo-3-chloro-5,5-dimethyl-hydantoin, which results in the oxidation of said nitrite formed by activity of bacterial in the condensate to a non-reactive nitrate, and which slows the growth of said bacteria in the cooling tower and catch basin. The process additionally includes periodically introducing into the condensate with amounts of a second biocide, such as dodecylguanidine hydrochloride or isothiazalone, which provides most of the control or organism growth in the cooling tower and catch basin. To prevent system corrosion, the process may include treating the condensate with a non-organic, phosphate-based corrosion inhibitor and scale dispersant.

57 Claims, 3 Drawing Sheets

PROCESS FOR TREATING AMMONIA AND NITRITE CONTAINING WATERS TO PREVENT NITRIC OXIDE EMISSIONS THEREFROM

BACKGROUND OF THE INVENTION

1. Field of the Invention

The present invention relates generally to processes for controlling the emission of nitrogen containing oxides from, and the growth of organisms, such as bacteria and algae, in, open cooling towers and the like in which ammonia and nitrite-containing waters are cooled.

2. Background Discussion

Subterranean reservoirs of aqueous geothermal fluids—steam, hot water, and hot brine—exist in many regions of the world. Such geothermal fluid reservoirs, many of which contain vast amounts of thermal energy, are most common where the near-surface temperature gradient of the earth is abnormally high, as is evidenced by unusually great volcanic, fumarole, and/or geyser activity. As an example, significant geothermal fluid sources are found along the Pacific Ocean Rim—a region long known for its high level of volcanic activity.

Aqueous geothermal fluids have, in some inhabited regions, been used for centuries for the therapeutic treatment of physical disorders. In these and/or in some other inhabited regions, such as Iceland and the Paris Basin of France, geothermal fluids have also long been used as heat sources for industrial processes and for heating dwellings and other buildings. Moreover, in some places, such as Italy and Northern California, geothermal steam has been successfully used for a number of years to generate commercially significant amounts of electric power. In the late 1970s, for example, about 2 percent of all the electric power used in the State of California was produced by geothermal steam at The Geysers in Northern California, and presently enough electric power is generated at The Geysers to satisfy the combined electricity needs of the cities of San Francisco and Oakland, Calif. More recently, moderate amounts of electric power have been generated, notably in the Imperial Valley of Southern California near the Salton Sea, by geothermal brine, which is much more difficult to use than geothermal steam.

Such factors as the steep increases, in the early 1970s, in the cost of petroleum products and natural gas and projected future shortages and high costs of such resources have led to the recently increased interest in further developing the use of geothermal fluids as alternative, and generally self-renewing, electric power plant "fuels." Much of this effort has been and is being directed toward developing more economically practical systems and processes for using geothermal brine to generate electric power because, although more difficult than geothermal steam to use, there are many more good sources of geothermal brine than there are good sources of geothermal steam.

General processes by which geothermal brine can be used to generate electric power have, of course, been known for some time. Geothermal brine, having a wellhead temperature of over about 400° F. and a wellhead pressure of over about 400 psig, can, for example, be flashed to a reduced pressure to convert some of the water or brine into steam. Steam produced in this manner is then used in generally conventional steam turbine-type power generators to generate electricity. On the other hand, cooler, less pressurized, geothermal brine can be used in closed-loop, binary fluid systems in which a low-boiling point, secondary liquid is vaporized by the hot brine. The vapor produced from the secondary liquid is then used in a gas turbine-type power generator to generate electricity, the vapor being recondensed and reused. In both such cases, the "used" geothermal brine is most commonly reinjected into the ground to replenish the aquifer from which the liquid was produced and to prevent ground subsidence. Reinjection of geothermal brine is also often important to avoid problems typically associated with the disposal of the large amounts of saline and usually highly-contaminated liquid involved.

In spite of such general processes for using geothermal brine for producing electric power being known, difficult and costly problems are commonly encountered with the actual use of the heavily contaminated, saline, and corrosive brines. Moreover, these problems are frequently so costly to solve that the production of reasonable amounts of electric power at competitive rates by the use of geothermal brines has often been extremely difficult to achieve in many locations.

As mentioned above, many of these serious problems associated with the production and use of geothermal brines for the generating of electric power can be attributed to the usually complex chemical composition and extremely corrosive nature of many geothermal brines. At aquifer temperatures and pressures—which are often well in excess of 400° F. and 400 psig—aqueous geothermal liquids leach large amounts of salts, minerals, and elements from the aquifer formations, the geothermal liquids (brines) presumably being in chemical equilibrium with their producing formations.

Thus, although their compositions may vary considerably from location to location, geothermal brines typically contain very high levels of dissolved salts and silica, and appreciable amounts of dissolved metals and such non-condensable gases as hydrogen sulfide, ammonia, and carbon dioxide. Geothermal brines are usually acidic, with typical wellhead pH's of between about 5 and about 5.5. As a combined result of their composition and high temperature, geothermal brines are not only frequently some of the most corrosive liquids known, but most tend, without appropriate treatment, to rapidly deposit a tough, tenacious, siliceous scale onto contacted surfaces of pipe, valves, vessels, and so forth, especially in regions of the brine handling system downstream of flashing vessels in which brine pressure is greatly reduced.

Adding greatly to the problems associated with producing and using geothermal brines for the generation of electric power is the need for very large, continuous flows of brine in order to generate even relatively moderate amounts of electric power. As an illustration, the production of only about 10 megawatts of electric power requires a continuous flow of over a million pounds per hour of high temperature and pressure geothermal brine. Consequently, even relatively low-capacity geothermal brine power plants ordinarily require several very costly brine production and reinjection wells, and large quantities of expensive, large size, corrosion-resistant pipe, fittings, pumps, valves, flashing and clarifying vessels, filters and so forth just for extracting, handling, and disposing of the huge flows of geothermal brine needed. In addition, an associated power generating facility is ordinarily required for each brine handling facility.

One of the many problems which has added to the overall cost of producing electric power by the use of geothermal brines, relates to the undesirable emission of nitrogen dioxide ($NO_2$) from cooling tower waters used to extract waste heat from treated brine prior to its injection back into the earth. This is formed by the oxidation of ammonia in the brine by naturally occurring bacteria therein with the nitrites being formed therein by the reaction thereof in the cooling tower effluent with ferrous iron present in the brine. Nitrites can also produce acids which are quite corrosive to the cooling system and disposal piping.

Other difficult problems which, as is apparent from the discussion below, are related to the nitrogen dioxide emissions problem are the corrosion, by the steam condensate (which is used for cooling tower makeup), of metal parts of the condensate handling system and the rapid growth of organisms (including bacteria, fungi, and algae) in such parts of the condensate handling systems as open cooling towers and associated condensate catch basins. Unless controlled, these corrosion problems require the use of costly, corrosion-resistant materials or the frequent costly replacement of common steel components. In turn, the growth of organisms in the condensate cooling towers and catch basins usually not only adds substantially to condensate-handling system corrosion problems but also causes the fouling and loss of efficiency of cooling towers and other parts of the condensate handling system, the latter requiring frequent, costly system cleaning. It is, of course, to be appreciated that whenever system shutdown is required to replace corroded pipe or equipment or to clean the system of organism-caused contaminants, the resulting loss of electric power revenue during shutdown usually adds substantially to the overall cost associated with the servicing operations.

To overcome these and other corrosion problems in condensate-handling systems, corrosion inhibitors are commonly added to the condensate of steam derived from ammonia-containing brines. The use of heavy metal corrosion inhibitors has been effective in controlling the growth of organisms in open condensate cooling towers and catch basins since they are toxic to the organisms.

Such multi-function, heavy metal corrosion inhibitors would, therefore, seem to be ideal for use in systems which handle corrosive condensate of steam derived from ammonia-containing geothermal and other brines. However, a serious disadvantage is that the heavy metal sludges formed by the use of heavy metal corrosion inhibitors is now classified as a toxic or hazardous waste material in many localities. Consequently, the disposal of these sludges, which may, for example, be formed in a geothermal brine power plant, is difficult and expensive—and is destined to become even more difficult and expensive in the future, as more stringent controls are applied to the disposal of such materials and as hazardous waste disposal sites become scarcer, more remote, and more costly to use.

Thus, in spite of their effectiveness in inhibiting corrosion and also for controlling the growth of organisms, the continued use of heavy metal corrosion inhibitors in systems handling ammonia-containing condensate is becoming increasingly less practical.

Non-heavy metal corrosion inhibitors, which do not form hazardous waste materials in the presence of ammonia, carbon dioxide and/or hydrogen sulfide, have thus recently been used in some condensate handling systems of the type mentioned above. Representative of these non-heavy metal corrosion inhibitors are such inorganic, phosphate-based materials as Betz Dianodic II, available from Betz Laboratories, Inc., Trevose, Pa.

However, unlike their counterpart heavy metal corrosion inhibitors, phosphate-type corrosion inhibitors have not been effective in controlling either hydrogen sulfide and nitrogen dioxide emissions or the growth of organisms. The use of such alternative types of corrosion inhibitors has, as a result, created an important need for a compatible process (or processes) for controlling hydrogen sulfide and/or nitrogen dioxide emissions and organism growth in systems for handling steam and condensate derived from hydrogen sulfide, carbon dioxide and ammonia-containing geothermal brines.

It is, however, important that any new process for controlling nitrogen dioxide emissions from, and the growth of organisms in, steam condensate handling portions of geothermal brine power plants not only be effective, for example, to avoid penalties for excessive $NO_2$ emissions, but that it also be economical to use. If a process is effective for controlling $NO_2$ emissions and organism growth but is uneconomical—for example, if it is more costly than the cost of disposing of the heavy metal sludges produced by the use of heavy metal corrosion inhibitors—the process is of little, if any, practical use in actual geothermal brine power plants.

SUMMARY OF THE INVENTION

According to the present invention, an effective and economical process is provided for controlling both the emission of nitrogen dioxide from, and the growth of organisms in, systems for handling flows of steam and condensate of steam derived from a nitrite- and ammonia-containing geothermal source. The present process comprises: (i) contacting, in a substantially continuous manner, the flow of condensate with an amount of an oxidizing biocide or an oxidation inducing material which substantially prevents the emission of nitrogen dioxide from the system but does not substantially inhibit the growth of organisms seen as algae bacteria and fungi in the system, and (ii) contacting, in a periodic manner, the flow of condensate with an amount of a second biocide which substantially reduces the amount of live organisms in the system.

As used herein the term "biocide" is to be considered to include biostats (which stop or retard the growth of organisms such as bacteria algae and fungi without necessarily killing them), and therefore include, without limitation, bacteriacides, bacteriastats, algicides, algistats, fungicides, and fungistats.

Also as defined herein, the expression "not substantially inhibit" means that the nominal growth rate of organisms such as bacteria, fungi and algae resident in the catch basin, as observed prior to the addition of the first oxidizing biocide, is reduced to an extent between about 0.01 and about 10 percent, after said biocide is applied and "substantial reduction" means at least about 90 percent of said organisms are destroyed after said second biocide is applied.

The oxidizing biocide is preferably selected from the group consisting of trichloro-isocyanuric acid and salts thereof, 1-bromo-3-chloro-5,5-dimethyl-hydantoin and other halogenated substituted hydantoins, and mixtures thereof, the more preferred oxidizing biocide being trichloro-isocyanuric acid. Although the second biocide may be the same as the oxidizing biocide, it is preferably a non-oxidizing biocide selected from the group consisting of dodecylguanidine hydrochloride, isothiazalone, and mixtures thereof.

In the common situation in which the source of nitrite in the condensate is ammonia, an amount of oxidizing biocide is added to the flow of condensate which is effective for causing at least substantial amounts of the nitrite to be converted to a stable, innocuous nitrate salt. Nitrates do not react appreciably in the brine and so do not break down to form the oxide under the conditions found in the system. In the preferred embodiment, the amount of the oxidizing biocide added to the flow of condensate is, however, very small compared to the stoichiometric amount of biocide which would itself be needed to oxidize all the nitrite ion in the condensate to a nitrate, a catalytic effect being apparently involved which causes oxidation of the nitrite ion to a nitrate. Preferably less than about 10 percent, and more preferably less than even about 1.3 percent, of the stoichiometric amount of oxidizing biocide is needed to substantially prevent the emission of $NO_2$ from the condensate when it mixes with the brine. In this regard, it is preferred that between about 0.5 and about 20 PPMW (parts per million by weight) relative to the condensate of the oxidizing biocide, and more preferably between about 0.5 and about 5 PPMW relative to the condensate, is added to promote the conversion of the nitrite to nitrate and to slow the growth of organisms in the condensate.

The second biocide is added to the flow of condensate in amounts and at periodic intervals which have been determined to effectively control the growth of the organisms in the condensate handling system to below problem levels. In this regard, preferably between about 25 and 200 PPMW of the second biocide, relative to the condensate, is preferably added to the condensate, at preferred intervals of between about 1 week and about 4 weeks, to periodically reduce the live organism count to relatively low levels, e.g., to below about 10,000 per liter of condensate.

Alternatively, the second biocide may be added to the condensate when or after the level of live organisms in open regions of the condensate handling system reaches a predetermined level, for example, between about 1 million and about 10 million per liter of condensate. In such case, the second biocide is preferably added to the condensate to reduce the level of live organisms to less than about 10,000 per liter.

Further in accordance with the preferred embodiment of the invention, the process may include contacting the condensate with between about 10 and about 50 PPMW, relative to the condensate, of an inorganic, phosphate-based corrosion inhibitor, such as Betz Dianodic II.

The present process controls the emission of $NO_2$ from the condensate handling system in a substantially continuous manner, as is needed, while the organism growth in the system is controlled in a periodic, "saw-tooth" manner, as is satisfactory. Such a two-stage biocide treatment of the condensate provides an effective, yet economical, process for preventing nitrogen dioxide emission and controlling organism growth in condensate handling systems, and is particularly useful in systems for handling condensate derived from ammonia-containing geothermal brine.

BRIEF DESCRIPTION OF THE DRAWINGS

The present invention will be more readily understood by reference to the drawings, in which.

DESCRIPTION OF THE PREFERRED EMBODIMENT

According to the present invention, a process is provided for controlling, in an effective and economical manner, nitrogen dioxide emissions from, and the growth of organisms, such as bacteria, fungi, and algae, in, systems for handling condensate of steam derived from ammonia-containing geothermal brine. It is, however, considered that the present process can be more readily understood and appreciated by first considering an exemplary geothermal brine power plant 10 (depicted, in block diagram form, in FIG. 1) in which steam is obtained from geothermal brine and is used for the generation of electric power. In the process of using the derived steam in this manner, the steam is condensed and the condensate is advantageously treated by the present process for the stated control purposes.

Figure 1:
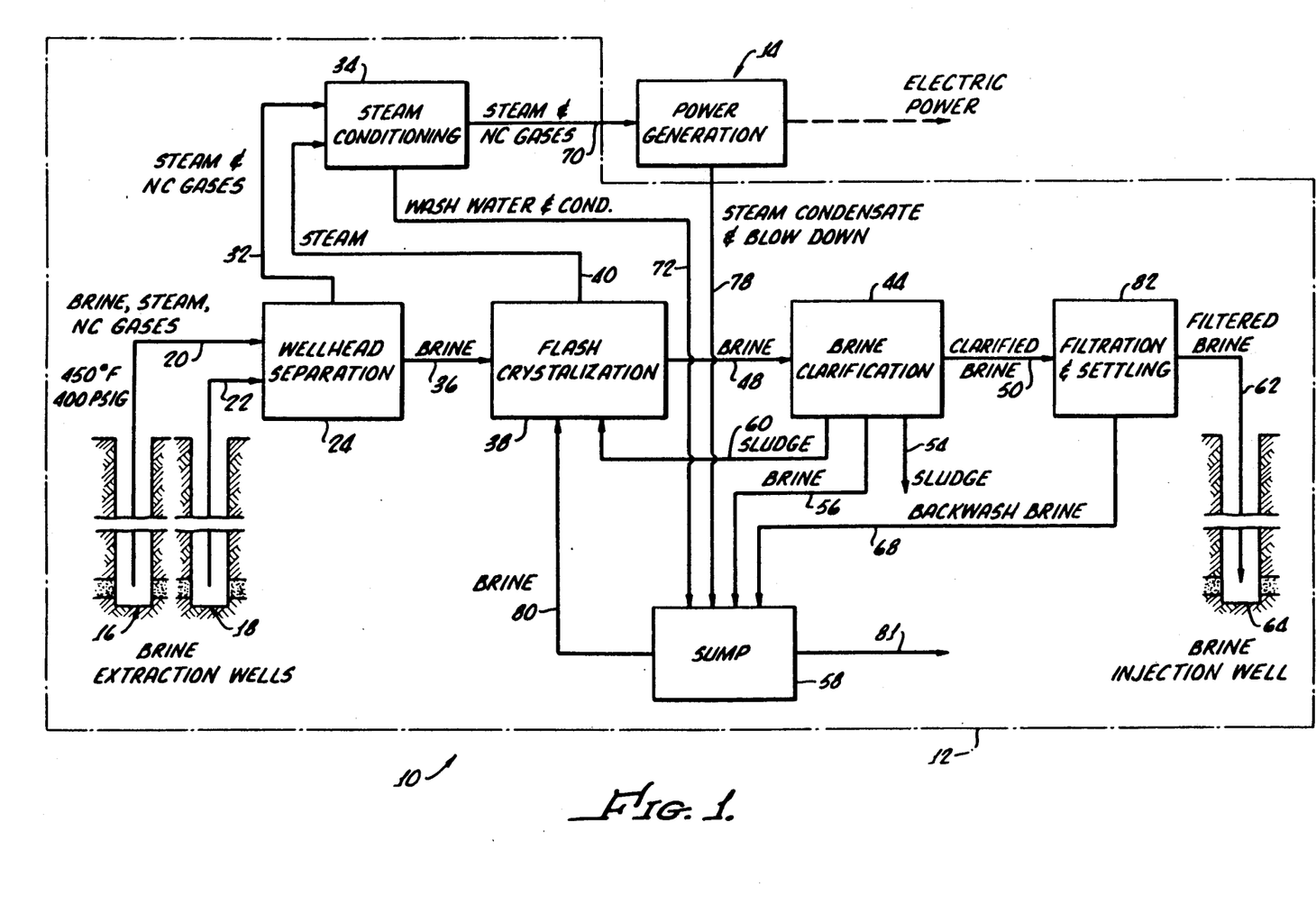
FIG. 1 is a schematic diagram of an exemplary, geothermal brine electrical power plant (10) having a brine extraction, handling, and reinjection portion (12) which produces steam for an associated power generating portion (14)

Shown as generally comprising geothermal brine power plant 10 are a brine handling portion 12 and a power generating portion 14. As more particularly described below, brine handling portion 12 is constructed for extracting, separating, flashing, treating (that is, clarifying and filtering), and reinjecting the geothermal brine used to provide steam for electric power production in portion 14. Also, as is more particularly described below, steam is provided from brine handling portion 12 by both the brine separating and flashing operations. Power generating portion 14 is constructed for using the steam from brine handling portion 12 to generate electric power and for subsequently condensing the steam.

BRINE HANDLING PORTION 12

Brine handling portion 12, as shown in FIG. 1, comprises respective first and second brine extraction wells 16 and 18, each of which may be several thousand feet deep. More or fewer than two such wells may, however, be needed for some geothermal brine power plants. From wells 16 and 18, the extracted, two-phase mixture of brine and steam (with non-condensable gases), having a typical wellhead temperature and pressure of about 450° F. and about 400 psig, is flowed through respective conduits 20 and 22, to a wellhead separation stage 24. Steam and non-condensable gases, including ammonia, hydrogen sulfide and carbon dioxide, are separated from the brine in wellhead separation stage 24. The steam and gases are flowed, through a conduit 32, from separation stage 24 to a steam conditioning stage 34, the brine being flowed, through a conduit 36, from the separation stage to a flash-crystallization stage 38.

The geothermal brine entering flash-crystallization stage 38 through conduit 36 is flashed, usually in a series of steps, to a reduced or atmospheric pressure, thereby converting some (for example, about 10 percent) of the brine into steam. At least the high pressure steam from flash crystallization stage 38 is supplied, through a conduit 40, to steam conditioning stage 34. To reduce the formation of siliceous scale on downstream brine handling equipment, flash-crystallization stage 38 may be configured for removing dissolved silica from the brine by a crystallization or seeding process.

Flashed brine, with siliceous material suspended therein, is flowed from flash-crystallization stage 38, through a conduit 42, into a brine clarification stage 44 wherein most of the siliceous material is gravity separated from the brine. Clarified brine overflow, usually still with small amounts fine suspended siliceous material, is flowed from clarification stage 44, through a conduit 50, into a brine filtration and settling stage 52. Dewatered sludge (still containing some brine) is discharged from brine clarification stage 44, through a conduit 54, for disposal. Brine from the dewatering operation in clarification stage 44 is discharged, through a conduit 56, into a sump 58. A slurry of siliceous sludge is fed back upstream from clarification stage 44, through a conduit 60, into flash-crystallization stage 38 as seed material for the silica crystallization purposes.

Filtered brine from brine filtration mineral recovery and settling stage 52 is pumped, through a conduit 62, into an injection well 64 through which the brine is injected into the ground—usually into the underground aquifer from which it is extracted. Brine from the backwashing of filters in filtration and settling stage 52 is discharged from such stage, through a conduit 68, into sump 58. Brine from any process stage, in emergency, is discharged through various conduits into sump 58.

Steam and non-condensable gases from conduits 32 and 40 are cleaned in steam conditioning stage 34, the cleaned steam and gases being then flowed, through a conduit 70, into power generating portion 14. Wash water from steam conditioning stage 34 is discharged, through a conduit 72, into sump 58. As is described below, some steam condensate and condensate blowdown is discharged from power generating portion 14, through a conduit 78, into sump 58. When brine containing iron mixes with a condensate blowdown containing nitrite in sump 58, $NO_2$ gas is generated. The more nitrite in the blowdown, the greater the potential for $NO_2$ production. Brine, water, and condensate overflow from sump 58 can either be fed, through a conduit 80, back to flash crystallizer 38, or through conduit 81 to a dedicated injection well provided for oxygenated fluids (not shown).

POWER GENERATING PORTION 14

Figure 2:
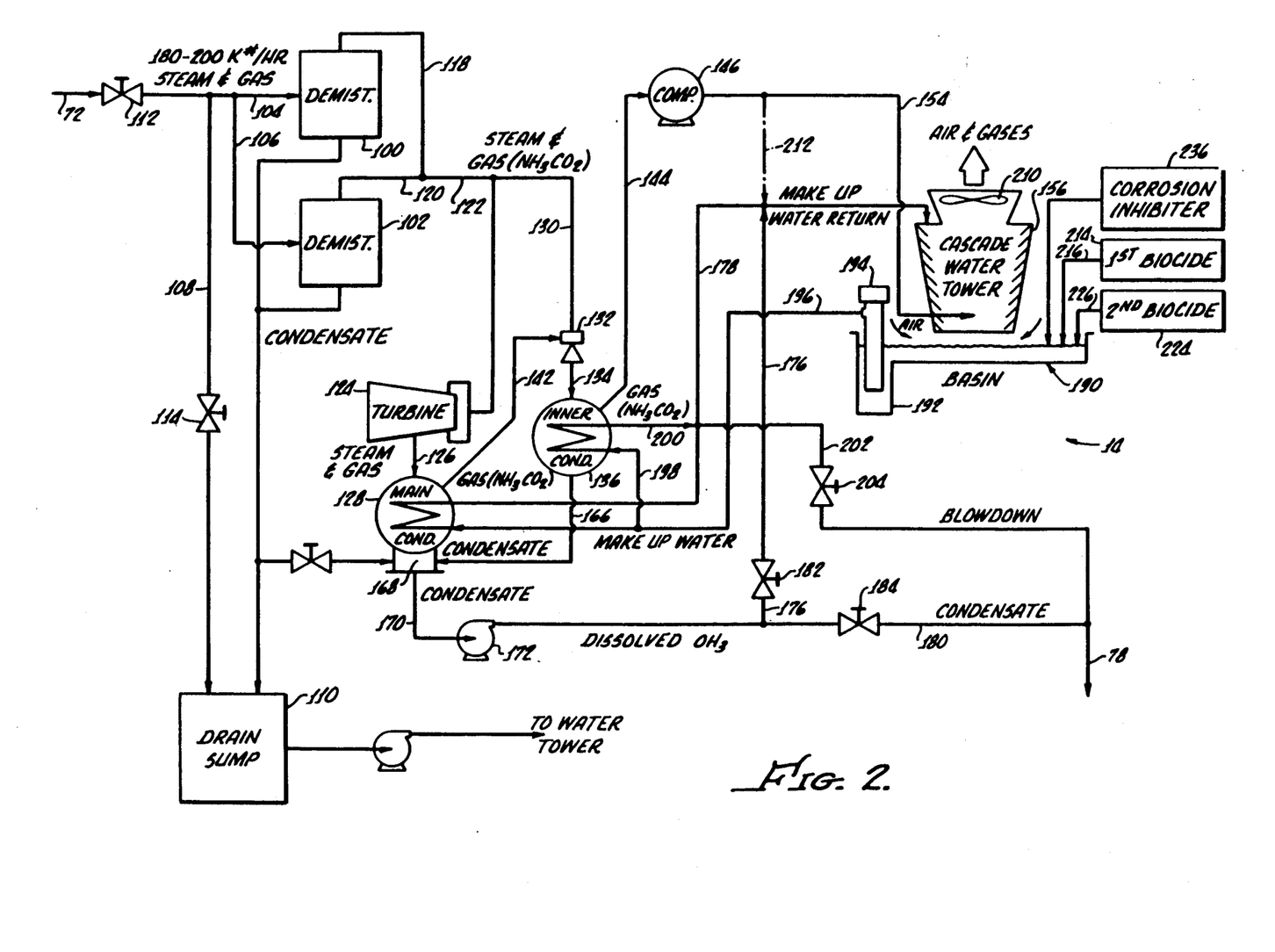
FIG. 2 is a diagram of power generating portion (14) of the power plant of FIG. 1, showing the layout of equipment used for generating electrical power from the steam and for handling and cooling the steam condensate, and in which the present process of adding biocides, in two stages, for controlling nitrogen dioxide emissions and bacteria growth may be used to advantage.

Exemplary power generating portion 14, in which the present invention is used, is depicted in some--but not complete--detail in FIG. 2. The steam and non-condensable gas mixture, provided to power generating portion 14 (through conduit 70) from steam conditioning stage 34, is flowed into respective first and second demisters 100 and 102 through conduits 104 and 106. A steam venting conduit 108 connected between conduit 70 and a drain sump 110 enables the discharge of steam in the event of steam or power generating problems. Valves 112 and 114 in respective conduits 70 and 108 control the flow of steam and non-condensable gases into power generation portion 14 and sump 110.

From demisters 100 and 102, the steam and noncondensable gas mixture is flowed, through respective conduits 118 and 120 and through a common conduit 122, into a steam turbine-generator 124. To increase the efficiency of turbine-generator 124 in a known manner, the steam discharged therefrom is typically cooled and condensed. To this end, steam—with substantially reduced energy—and non-condensable gases are discharged from turbine-generator 124, through a conduit 126, into a main condenser 128. A small slipstream of steam and gases is diverted from conduit 122, through a conduit 130, to a steam eductor 132. From eductor 132, the slipstream is flowed, through a conduit 134, to a second condenser 136, which is commonly referred to as an "inner" condenser.

Separated non-condensable gases are discharged from main condenser 128, through a conduit 142, into eductor 132, and from there, through conduit 134, into inner condenser 136. In turn, the non-condensable gases from inner condenser 136 are fed, through a conduit 144, to a compressor 146. Compressed gases are normally discharged from compressor 146 through a discharge conduit 154 containing a sparger (not shown) at the base of an open, cascade-type, condensate cooling tower 156. Alternatively, the gases may be fed, via conduit 212, directly into make-up water line return line 178.

Steam condensate is discharged from inner condenser 136, through a conduit 166, into an outlet region 168 of main condenser 128. From condenser outlet region 168, steam condensate (from both condensers 128 and 136) is flowed, through a conduit 170, to a condensate pump 172 which pumps the condensate, through conduits 174 and 176, into a make-up water return conduit 178 at a point downstream of inner condenser 136.

A bypass conduit 180, connected at the junction of conduits 174 and 176, enables steam condensate to be discharged by pump 172 into conduit 78, which empties into sump 58 (FIG. 1). Valves 182 and 184 in respective conduits 176 and 180 enable dividing the condensate between these two conduits.

An open condensate catch basin 190, having a sump region 192, is disposed beneath cooling tower 156 to receive cooled condensate therefrom. A pump 194 pumps condensate from sump region 192, through a conduit 196, into main condenser 128 for steam condensation purposes. A conduit 198, connected into conduit 196, enables condensate to be pumped also into inner condenser 136. Make-up water return conduit 178 is connected between main condenser 128 and the top of cooling tower 156, a conduit 200 from inner condenser 136 being connected into the return conduit.

A condensate blowdown conduit 202 is connected between make-up return conduit 178 and conduit 78 which discharges into sump 58 (FIG. 1). A valve 204 in conduit 202 is operated whenever blowdown is needed, for example, when the condensate in catch basin 190 reaches an excessive level or when an excessive amount of sludge builds up in catch basin 190.

Typically, the condensate handling portions (including condensers 128 and 136, cooling tower 156, catch basin 190, and the various associated condensate con- duits, such as conduits 178 and 196) have a condensate-holding capacity or volume which is at least several times, for example, at least about five times, as great as the rate at which steam is flowed into power plant portion 14. Accordingly, most of the condensate is recirculated for a period of time through such condensate handling portions before it evaporates from cooling tower 156.

THE PRESENT CONDENSATE TREATMENT PROCESS

As mentioned above, the bulk of the ammonia entering power generating portion 14 with the steam typically passes into the condensate phase in condensers 128 and 136. This is presumably due to an excess of carbon dioxide in the steam which increases the solubility of ammonium carbonate in the condensate by reacting (as a base) with carbon dioxide to form ammonium carbonate and/or ammonium bicarbonate according to the reactions:

$$CO_2 + 2NH_3 \xrightarrow{H_2O} (NH_4)_2CO_3 \quad (1)$$

$$CO_2 + NH_3 \xrightarrow{H_2O} (NH_4)HCO_3 \quad (2)$$

However, it is possible that other ammonia precursors (that is, compounds from which ammonia may outgas or be released during condensate treatment operations) may be formed in the condensate. The present invention is effective regardless of the form the ammonia is in, i.e., as ammonia itself or as a precursor thereof.

To a partial extent, when the condensate cascades downwardly through cooling tower 156, the ammonia is released, either directly or indirectly by breakdown of the ammonia precursors. For example, if the precursor is ammonium carbonate, carbon dioxide and ammonia are released. These are then mixed with air and blown into the atmosphere by a cooling tower fan 210.

Many types of air-borne organisms have been found to grow at a very rapid rate in the hot, wet environment of cooling tower 156 and condensate catch basin 190. As an example, among the bacteria usually found in cooling tower 156 and catch basin 190 when ammonium compounds are present are nitrifying bacteria such as Nitrosomonas and Nitrobacter, which consume ammonia in the cooling tower and produce nitric and nitrous acids which thereby add to system corrosion problems and $NO_2$ emissions when the condensate materials contact iron-containing brine. Furthermore, the slime formed by most types of bacteria, as well as by algae, in cooling tower 156 and catch basin 190 tends to cause severe fouling thereof and the subsequent loss of efficiency. Moreover, cooling tower 156 and catch basin 190 then become a source of organisms which are blown into the atmosphere by the cooling tower by fan 210.

The present inventors have determined that nitrogen dioxide emissions from sump 58, and the growth of organisms in cooling tower 156 and catch basin 190, can be effectively controlled in an economic manner by the present process without creating any new problems.

According to the nitrite and organism growth-controlling process of the present invention, it is preferred that small amounts of a first, oxidizing biocide are introduced into (for contact with) the condensate in a continuous, or at least a substantially continuous, manner and preferably at a rate effective for substantially eliminating the formation of reactive nitrite from cooling tower 156 and catch basin 190 while also inhibiting, at least to some extent, the growth of living organisms in the cooling tower and catch basin. As an example, the first biocide may be slowly and continuously added to catch basin 190 from a source 214 through a conduit 216. Alternatively, a slowly-dissolving pellet or pellets of solid first biocide may be periodically dropped into catch basin 190. In either of such cases, the first biocide is to be considered, for purposes of the present invention as being "added" to the condensate in a continuous or substantially continuous manner.

It has, however, been determined by the present inventors (for reasons described below) that when just enough of the first biocide is added to the condensate to effectively convert any nitrite therein to nitrate on a continuous basis, the growth of algae, fungi and bacteria in cooling tower 156 and/or catch basin 190 need not be completely or even substantially inhibited. Although much greater quantities of the first biocide could be continuously added to the condensate to completely inhibit the growth of organisms in cooling tower 156 and catch basin 190, the resulting process would be excessively expensive, since it is not considered essential, in the present invention, to completely control the growth of the organisms in the system with the first biocide.

Figure 3:
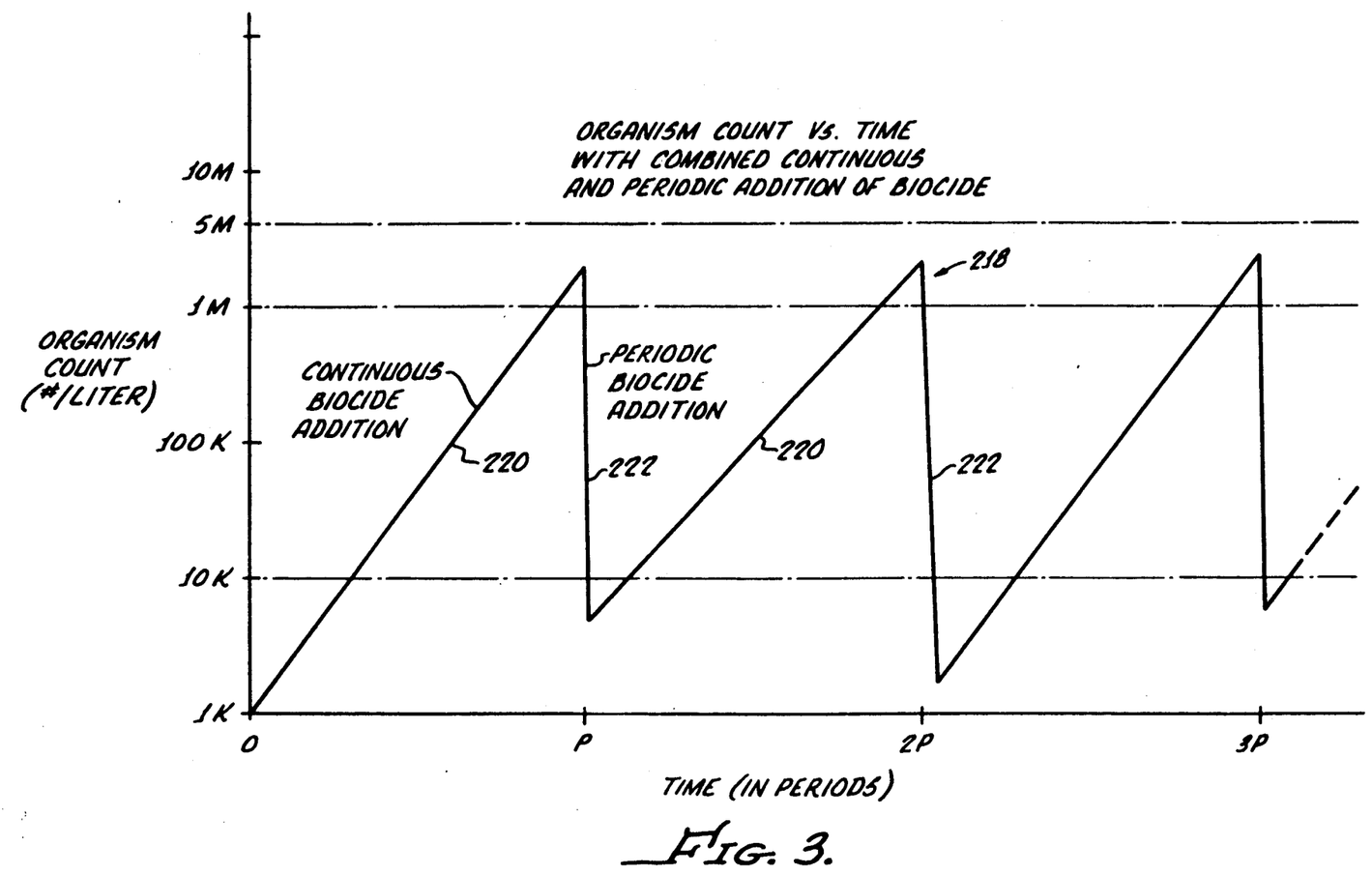
FIG. 3 is an exemplary graph on which is plotted an exemplary and idealized live bacteria count in a condensate cooling tower catch basin (190), which forms a part of power generating portion (14), as a function of power plant operating time, the graph showing a representative saw-tooth effect on organism growth which results from the continual addition of small amounts of a first biocide and the periodic addition of larger amounts of a second biocide.

It is thus preferred to "completely" control the growth of these organisms on a periodic rather than a continuous basis by adding to the condensate in cooling tower 156 and catch basin 190, an additional, relatively large, "shock" amount of a biocide on a weekly or monthly basis. The effect of so doing is shown in FIG. 3. In combination with the organism-growth control provided by the oxidizing biocide, the periodic shock treatment of the condensate relatively large slugs of biocide results in a generally sawtooth-shaped "curve" 218 in which the growth of organisms is plotted as a function of time (expressed in terms of periods "P"). Gradually upward sloping portions 220 of curve 218 represent the gradual organism growth rate permitted by the continuous addition to the condensate of only small amounts of the oxidizing biocide and steeply decreasing portions 222 of curve 218 represent the periodic rapid decrease in the amount of organisms caused by the periodic addition to the condensate of relatively large amounts of the second biocide. As can be seen in FIG. 3, the periodic shock treatment as performed in the present invention consistently reduced the total organism counts to under 10,000/liter, which is at least about a 99 percent reduction.

The described two phase process of adding to the condensate small amounts of the oxidizing biocides on a continual basis and large amounts of the shock biocide on a periodic basis has been found to be more cost effective than the continual adding of a larger amount of oxidizing biocide sufficient to constantly control the growth of organisms, and to be just as satisfactory.

As indicated in FIG. 2, the second biocide can be introduced into catch basin 190 from a source 224 and through a conduit 226. Since the second biocide is intended to act rapidly on organisms in cooling tower 156 and catch basin 190, the entire periodic slug of second biocide can be dumped into the catch basin at one time.

As can be appreciated, the actual amounts of the shock biocide and the intervals between the addition thereof to the condensate depend upon the organism growth characteristics, which may, in turn, depend upon such factors as the geographic location of power plant portion 14, the temperature in cooling tower 156 and catch basin 190, and the type(s) of organisms present. However, the amounts and intervals can be readily determined for a particular cooling tower 156 and catch basin 190 by the simple expedient of measuring the live bacteria count therein from time to time. In general, however, intervals of between about 1 and about 4 weeks are preferred.

It is preferred that the first, oxidizing biocide be selected from trichloro-isocyanuric acid and the alkali and alkaline earth metal salts thereof, 1-bromo-3-chloro-5,5-dimethyl-hydantoin and other halogenated substitutions of hydantoin, and mixtures thereof. For such reasons as lower cost and lesser amounts required to achieve good control of nitrite formation and organism growth, the more preferred oxidizing biocide is the trichloro-isocyanuric acid (triazine). Although the shock biocide can be the same as the oxidizing biocide, for greater effectiveness, it is preferred that it be a non-oxidizing biocide and that it be selected from dodecyl-guanidine hydrochloride, isothiazalone, and mixtures thereof.

A corrosion inhibitor, which is preferably a non-heavy metal inhibitor and which is preferably selected from an inorganic phosphate passivator and scale dispersant, such as Betz Dianodic II, may, as shown in FIG. 2, be fed from a source 230 which discharges through a conduit 232 into catch basin 190. Alternatively, the corrosion inhibitor can be dumped directly into catch basin 190. It is also preferred that the corrosion inhibitor be added to the condensate in a concentration of between about 10 and about 50, and more preferably an inhibitor concentration of between about 18 and about 28, PPMW relative to the condensate to which the inhibitor is added.

As used herein, the concentration notation "PPMW relative to the condensate" (regardless of the additive material involved) is to be understood to mean the concentration of the added material in parts per million by weight relative to the total volume of condensate handling portions—including condensers 128 and 136, cooling tower 156, catch basin 190 and such conduits as 178 and 196—of power plant portion 14. This is the case even though condensate is continually being added (from condensers 128 and 136) to, and condensate is continually being removed (by evaporation in cooling tower 156) from the condensate handling portion, and is further the case even when the amount of material added does not go into solution immediately. In either such case, an extracted sample of the condensate would generally not actually have the stated concentration of the added material. Such a designation for concentration of added materials is, however, consistent with the standard practices followed in the water treatment industry.

In an actual practice of the present process, the oxidizing biocide is believed to oxidize the nitrite in the steam condensate to an innocuous nitrate. Probable reactions for the oxidation of the nitgite in the condensate to nitrate by the trichloro-isocyanuric acid and hydantoin biocides are given by respective equations (3) and (4) below:

$$3HNO_2 + 4C_3N_3O_3Cl_3 + 3H_2O \longrightarrow \quad (3)$$

$$\text{-continued}$$
$$3HNO_3 + C_3H_3N_3O_3 + 3HCl$$

$$2HNO_2 + C_5H_6N_2O_2BrCl + 2H_2O \longrightarrow \quad (4)$$

$$2HNO_3 + C_5H_8N_2O_2 + HBr + HCl$$

It was expected that the amount of oxidizing biocide required to prevent the formation of nitrites in the condensate would be the stoichiometric amount for reacting with the nitrite/nitrous acid in accordance with such reaction equations as Equations (3) and (4). A concern was that a process using a stoichiometric amount of the oxidizing biocide would not be very economical. It was, however, unexpectedly and surprisingly discovered by the present inventors that the amount of oxidizing biocide needed to reduce the nitrite ion concentration to less than about 10 percent, preferably to less than about 5 percent, more preferably to less than about 1 percent, and very most preferably to less than about 0.5 percent of the nitrite ions entering into cooling tower 156 and catch basin 190 is only an extremely small percentage—for example, only about 0.05 to about 0.1 percent—of the stoichiometric amount of oxidizing biocide. Why only such a very small amount of oxidizing biocide is needed to completely oxidize the nitrites present and, therefore, eliminate NO2 emissions from cooling tower 156, catch basin 190 and sump 58 is not completely understood. Apparently, the biocide—possibly in conjunction with the small amounts of some materials, such as heavy metals, carried over into the condensate from the geothermal brine—functions as a catalyst in the oxidation of the nitrite by oxygen in the condensate (for example, from air picked up as the condensate cascades through cooling tower 156) in accordance with the following oxidation reaction:

$$NO_2^- + \tfrac{1}{2}O_2 \xrightarrow{\text{Cat.}} NO_3^- \quad (5)$$

The theory that a catalytic reaction is somehow involved is borne out by the observation that much less oxidation of the nitrite in the condensate occurs, in accordance with reaction Equation (5), in the absence of small amounts of the oxidizing biocide in the condensate. It is, of course, to be understood that the present invention is not to be held to this or to any other theory of operation.

The present invention may be further described with reference to the following Example in which the same reference numbers identified above are used.

EXAMPLE

A two-phase mixture of geothermal brine and steam, at a wellhead temperature of about 450° F. and a wellhead pressure of about 450 psig, is extracted at a rate of about one million pounds per hour from brine production wells 16 and 18 (FIG. 1). The two-phase mixture has a hydrogen sulfide concentration of about 10 PPMW, an ammonia concentration of about 350 PPMW, and a carbon dioxide concentration of 2,000 ppmw (relative to the two-phase mixture from the well).

A combined amount of between about 180,000 and about 220,000 pounds per hour of separated and flashed steam is supplied by the above-stated amount of the two-phase mixture to steam conditioning stage 34 from wellhead separation stage 24 and flash crystallization stage 38. This amount of supplied steam contains about 10 pounds per hour of hydrogen sulfide (as a non-condensable gas), about 1,600 pounds of carbon dioxide, and about 50 pounds per hour of ammonia, also as non-condensable gases.

After exiting turbine 124, the steam is condensed in condensers 128 and 136, about 95 percent of the 50 pounds per hour of ammonia—that is, about 47 pounds per hour—entering the condensate to form ammonium carbonate. The pH of the condensate is about 9.0.

The condensate capacity of the condensate handling portion (including condensers 128 and 136, cooling tower 156 and catch basin 190) of power plant portion 12 is about one million pounds.

Betz Dianodic II corrosion inhibitor is added to the condensate in catch basin 190 to provide an inhibitor concentration of between about 18 and about 28 PPMW relative to the condensate.

Between about 1 and about 4 pounds per day of 1-bromo-3-chloro-5,5-dimethyl-hydantoin oxidizing biocide is added to the condensate in catch basin 190 so as to provide a concentration of between about 1 and about 4 PPMW relative to the condensate (as above-defined). The biocide is added in the form of one or more pellets weighing about 0.6 pounds each which slowly dissolve in the condensate over about a 24 hour period. Since steam is provided to power generating portion 14 at a rate of between about 4.32 million and about 5.28 million pounds in a 24 hour period, the oxidizing biocide is added to the condensate at a rate which can alternatively be considered to be between about 0.18 and about 0.93 PPMW relative to the flow of steam into power plant portion 14. With the addition of between about 1 and about 4 pounds of oxidizing biocide a day into the condensate, the formation of nitrite in cooling tower 156 and catch basin 190 is essentially eliminated. This completely eliminates the potential for $NO_2$ emission when the blowdown mixes with the brine in sump 58 prior to disposal in a dedicated injection well.

The stoichiometric amount of the above-mentioned hydantoin biocide required, in accordance with Equation (3), to oxidize all of the nitrite in the condensate formed from 47 pounds per hour of ammonia is calculated to be about 13 pounds per hour, or about 300 pounds per day. The amount of the hydantoin actually required to substantially eliminate the nitrite from the condensate is thus between about 0.3 and about 1.3 percent of the stoichiometric amount of the hydantoin expected to be required.

Isothiazalone is used as the second, non-oxidizing biocide and is added to the condensate in catch basin 190 about every two weeks in an amount of about 50 PPM relative to the condensate.

The addition of the above-described amounts of the hydantoin and isothiazalone biocides is found to effectively control the growth of organisms in cooling tower 156 and catch basin 190.

Although there has been described above a preferred embodiment of a process for controlling the emission of $NO_2$ from, and nitrite formation and the growth of organisms such as algae, fungi and bacteria in a system for handling steam and steam condensate derived from ammonia-containing geothermal brine in accordance with the present invention for the purpose of illustrating the manner in which the invention may be used to advantage, it will be appreciated that the invention is not limited thereto. Accordingly, the invention may be used in any facility producing ammonia containing streams under circumstances which allow the ammonia to be oxidized to form nitrite compounds. Such streams occur in ammonia plants and plants producing organic nitrogen products such as amines, amides and nitro-compounds, nitrogen containing fertilizers and similar products. Consequently, any and all process modifications or variations which may occur to those skilled in the art should be considered to be within the scope of the invention as defined in the appended claims.

What is claimed is:

1. A process for controlling the emission of nitrogen dioxide from, and the amount of one or more organisms, selected from the group consisting of fungi, algae and bacteria, growing in a system for handling a flow of condensate of steam, the condensate containing ammonia, ammonia precursors, or a mixture thereof, the process comprising the steps of:
   (a) contacting the condensate in a substantially continuous manner with an amount of an oxidizing biocide which substantially prevents the emission of nitrogen dioxide from the condensate handling system but which does not substantially inhibit the growth of said organisms in the condensate handling system; and
   (b) periodically contacting the condensate with an amount of a second biocide which substantially reduces the amount of said organisms.

2. The process of claim 1 wherein the condensate contains nitrite and the amount of oxidizing biocide is sufficient to convert at least about 90 percent of the nitrite to a nitrate.

3. The process of claim 2 wherein the amount of oxidizing biocide added to the condensate is substantially less than a stoichiometric amount which would be needed to oxidize all of the nitrite in the condensate to nitrate.

4. The process of claim 3 wherein the amount of oxidizing biocide added to the condensate is less than about 2 percent of said stoichiometric amount.

5. The process of claim 3 wherein the amount of oxidizing biocide added to the condensate is less than about 0.3 percent of said stoichiometric amount.

6. The process of claim 1 wherein the oxidizing biocide is selected from the group consisting of trichloro-isocyanuric acid and alkali and alkaline earth metal salts thereof, 1-bromo-3-chloro-5,5-dimethyl-hydantoin and other halogenated substituted hydantoins, and mixtures thereof.

7. The process of claim 1 wherein the oxidizing biocide comprises trichloro-isocyanuric acid.

8. The process of claim 1 wherein the amount of oxidizing biocide added to the condensate is between about 0.5 and about 20 PPMW relative to the condensate.

9. The process of claim 1 wherein the second biocide is a non-oxidizing biocide which reduces the amount of organisms by at least 95 percent.

10. The process of claim 9 wherein the non-oxidizing biocide is isothiazalone.

11. The process of claim 1 wherein the amount of second biocide is between about 25 and about 200 PPMW relative to the condensate, and the periodic contacting is at intervals of between about 1 and about 4 weeks.

12. The process of claim 11 wherein, following each periodic contacting, the amount of organisms, in organisms/liter, is reduced to about 1 percent of the amount of organisms before said contacting with second biocide.

13. The process of claim 1 wherein, following each periodic contacting, the amount of organisms, in organisms/liter, is reduced to less than about 10 percent of the amount of organisms before said contacting with said second biocide.

14. The process of claim 1 further comprising contacting the condensate with a corrosion inhibitor.

15. The process of claim 14 wherein the corrosion inhibitor comprises an inorganic phosphate passivator and scale dispersant, said inhibitor being added to the condensate in an amount between about 10 and about 50 PPMW relative to the condensate.

16. The process of claim 1 wherein the condensate handling system includes a steam condenser in which steam is condensed to form the flow of condensate and from which a flow of non-condensable gases, including ammonia, is discharged, and wherein the process includes combining the flow of the condensate with a brine, containing ferrous iron, in a sump prior to disposal of the combined flow in an injection well.

17. A process for controlling the formation of nitrites, the emission of nitrogen dioxide, and the amount of one or more organisms selected from the group consisting of algae, fungi, and bacteria growing, from a system for handling a flow of condensate of steam, derived from a brine, the condensate containing nitrite, the process comprising the steps of:
   (a) contacting the condensate with an inorganic, phosphate-based corrosion inhibitor in an amount sufficient to substantially inhibit corrosion in the condensate handling system;
   (b) contacting the condensate, in a substantially continuous manner with an amount of an oxidizing biocide effective for converting at least substantial amounts of the nitrite to a nitrate, but which does not substantially inhibit the growth of said organisms; and
   (c) periodically contacting the condensate with an amount of a second biocide which substantially reduces the amount of said organisms.

18. The process of claim 17 wherein the oxidizing biocide is selected from the group consisting of trichloro-isocyanuric acid and alkali and alkaline earth metal salts thereof, 1-bromo-3-chloro-5,5-dimethylhydantoin and other halogenated substituted hydantoins, and mixtures thereof.

19. The process of claim 17 wherein the amount of oxidizing biocide is substantially less than a stoichiometric amount which would be needed to oxidize all of the nitrite in the condensate to a nitrate.

20. The process of claim 19 wherein the amount of oxidizing biocide is between about 0.3 and about 1.3 percent of said stoichiometric amount.

21. The process of claim 17 wherein the second biocide is a non-oxidizing biocide selected from the group consisting of dodecylguanidine hydrochloride, isothiazalone, and mixtures thereof.

22. The process of claim 17 wherein the amount of second biocide is between about 25 and about 200 PPMW relative to the condensate, and the periodic contacting is at intervals of between about 1 and about 4 weeks.

23. The process of claim 17 wherein, the second biocide is added in an amount sufficient to reduce the amount of organisms, in organisms/liter, to less than about 10 percent of the amount of organisms before each periodic contacting.

24. The process of claim 23 wherein the amount of organisms, in organisms/liter, is reduced to about 1 percent of the amount of organisms before each periodic contacting.

25. A process for use in a system in which a flow of ammonia-containing steam, derived from a geothermal fluid, is used to generate electric power, and which includes: (i) at least one steam turbine, (ii) at least one steam condenser downstream of the turbine, in which at least some of the steam is condensed to steam condensate and from which non-condensable gases, including ammonia, are discharged, and (iii) at least one cooling tower for cooling the condensate, the cooling tower being open to the atmosphere and having associated therewith a condensate catch basin, condensate from the condenser containing ammonium carbonate and being cooled in the cooling tower for use as make-up water for the condenser, said process (1) inhibiting corrosion of metals contacted by the condensate, (2) controlling the amount of one or more organisms, selected from the group consisting of algae, fungi and bacteria, growing in the cooling tower and the catch basin, and (3) controlling the emission of nitrogen dioxide from the cooling tower, said process comprising the steps of:
   (a) contacting said condensate with a corrosion inhibitor, which does not substantially abate the emission of nitrogen dioxide from or control the growth of said organisms in the condensate;
   (b) contacting said condensate in a substantially continuous manner with an amount of an oxidizing biocide which substantially prevents the emission of nitrogen dioxide from the cooling tower, but which does not substantially inhibit the growth of said organisms; and
   (c) periodically contacting the condensate with an amount of another biocide which substantially reduces the amount of said organisms.

26. The process of claim 25 wherein in step (c) the another biocide is a non-oxidizing biocide.

27. The process of claim 26 wherein the non-oxidizing biocide is selected from the group consisting of dodecylguanidine hydrochloride, isothiazalone, and mixtures thereof, and is added to the condensate in the amount of between about 50 and about 200 PPMW relative to the condensate.

28. The process of claim 27 wherein, following each periodic contacting, the amount of organisms, in organisms/liter, is reduced to about 1 percent of the amount before said non-oxidizing biocide was added.

29. The process of claim 26 wherein, following each periodic contacting, the amount of organisms, in organisms/liter, is reduced to less than about 10 percent of the amount before said non-oxidizing biocide was added.

30. The process of claim 25 wherein the oxidizing biocide is selected from the group consisting of trichloro-isocyanuric acid and alkali and alkaline earth metal salt thereof, 1-bromo-3-chloro-5,5-dimethylhydantoin and other halogenated substituted hydantoins, and mixtures thereof.

31. A process for reducing nitrogen dioxide emissions from a cooling tower in which an aqueous stream containing one or more nitrites dissolved therein is cooled, said process comprising:
   introducing into said aqueous stream, in a substantially continuous manner, an amount of an oxidizing biocide which results in the oxidizing of said nitrites to nitrates to substantially reduce the emissions of nitrogen dioxide from said aqueous stream, said amount being less than the stoichiometric amount required to oxidize all of the nitrite to nitrate and being of an amount which does not substantially inhibit the growth of organisms, selected from the group consisting of algae, fungi and bacteria, in said stream.

32. The process of claim 31 wherein bacteria and the process further comprises periodically introducing a biocide into the stream in an amount sufficient to reduce the amount of organisms by at least about 95 percent.

33. The process of claim 32 wherein, following each periodic introducting, the amount of organisms, in organisms/liter, is reduced to about 1 percent of the amount of organisms before each periodic contacting.

34. The process of claim 32 wherein the periodically-introduced biocide is a non-oxidizing biocide selected from the group consisting of dodecylguanidine hydrochloride, isothiazalone, and mixtures thereof.

35. The process of claim 34 wherein the non-oxidizing biocide is isothiazalone.

36. The process of claim 35 wherein the amount of non-oxidizing biocide added to the aqueous stream is between about 25 and about 200 PPMW relative to the aqueous stream, and the periodic introducing is at intervals of between about 1 and about 4 weeks.

37. The process of claim 36 wherein, following each periodic introducing, the amount of organisms, in organisms/liter, is reduced to about 1 percent of the amount before each introduction of non-oxidizing biocide.

38. The process of claim 31 wherein the oxidizing biocide is selected from the group consisting of trichloro-isocyanuric acid and alkli and alkaline earth metal salts thereof, 1-bromo-3-chloro-5, 5-dimethylhydantoin and other halogenated substituted hydantoins, and mixtures thereof.

39. The process of claim 38 wherein the amount of oxidizing biocide added to the aqueous stream is substantially less than the stoichiometric amount needed to oxidize all of the nitrite in the aqueous stream to a nitrate.

40. The process of claim 39 wherein the amount of oxidizing biocide added to the aqueous stream is less than about 2 percent of said stoichiometric amount.

41. The process of claim 31 wherein the oxidizing biocide is trichloro-isocyanuric acid.

42. The process of claim 31 wherein the amount of oxidizing biocide added to the aqueous stream is between about 0.5 and about 20 PPMW, relative to the aqueous stream.

43. The process of claim 31 further comprising contacting the aqueous stream with a corrosion inhibitor.

44. The process of claim 43 wherein the corrosion inhibitor comprises an inorganic phosphate passivator and scale dispersant which is added to the condensate in an amount of between about 10 and about 50 PPMW relative to the aqueous stream.

45. A process for use in a system in which a flow of ammonia-containing steam is used to generate electric power, and which includes: (i) at least one steam turbine, (ii) at least one steam condenser downstream of the turbine in which at least some of the steam is condensed to steam condensate and from which non-condensable gases, including ammonia, are discharged, and (iii) at least one cooling tower for cooling the condensate, the cooling tower being open to the atmosphere and having associated therewith a condensate catch basin, condensate from the condenser containing ammonium carbonate and being cooled in the cooling tower for use as make-up water for the condenser, said process (1) inhibiting corrosion of metals contacted by the condensate, (2) controlling an amount of one or more organisms selected from the group consisting of fungi, algae and bacteria growing in the cooling tower and the catch basin, and (3) controlling the emission of nitrogen dioxide from the condensate, said process comprising the steps of:
   (a) contacting said condensate with a corrosion inhibitor which does not substantially abate the emission of nitrogen dioxide from, or control the growth of said organisms;
   (b) contacting said condensate, in a substantially continuous manner, with an amount of trichloro-isocyanuric acid or an alkali or alkaline earth metal salt thereof which substantially prevents the emission of nitrogen dioxide from the cooling tower, but which does not substantially inhibit the growth of said organisms; and
   (c) periodically contacting the condensate with an amount of isothiazalone which reduces the amount of said organisms to about 1 percent of the amount, in organisms/liter, existing before said contacting.

46. A process for use in a system for handling a flow of condensate of steam, the condensate containing ammonia ammonia precursors, on mixtures thereof, for controlling the emission of nitrogen dioxide from, and the amount of one or more organisms selected from the group consisting of fungi, algae, and bacteria growing in the condensate handling system, the process comprising the steps of:
   (a) contacting the condensate, in a substantially continuous manner, with an amount of an oxidizing biocide which substantially prevents the emission of nitrogen dioxide from the condensate handling system but which does not substantially slow the growth of said organisms in the condensate handling system; and
   (b) periodically contacting the condensate with an amount of a non-oxidizing biocide which reduces the amount of said organisms.

47. The process of claim 46 wherein the condensate contains nitrite and the amount of oxidizing biocide is less than the stoichiometric amount which would be needed to oxidize all of the nitrite in the condensate to nitrate.

48. The process of claim 47 wherein the oxidizing biocide is selected from the group consisting of trichloro-isocyanuric acid and alkali and alkaline earth metal salts thereof, 1-bromo-3-chloro-5,5-dimethylhydantoin and other halogenated substituted hydantoins, and mixtures thereof.

49. The process of claim 47 wherein said oxidizing biocide is trichloro-isocyanuric acid, the amount of oxidizing biocide is less than about 2 percent of said stoichiometric amount, said non-oxidizing biocide is isothiazalone, the amount of non-oxidizing biocide is between about 25 and about 200 PPMW relative to the condensate, and the periodic contacting is at intervals of between about 1 and about 4 weeks.

50. The process of claim 49 wherein a corrosion inhibitor, comprising an inorganic phosphate passivator and scale dispersant, is added to the condensate in an amount between about 10 and about 50 PPMW relative to the condensate.

51. The process of claim 46 wherein the non-oxidizing biocide is selected from the group consisting of dodecylguanidine hydrochloride, isothiazalone, and mixtures thereof.

52. The process of claim 46 further comprising adding a corrosion inhibitor to the condensate.

53. The process of claim 52 wherein the corrosion inhibitor comprises an inorganic phosphate passivator and scale dispersant and is added to the condensate in an amount between about 10 and about 50 PPMW relative to the condensate.

54. A process for use in a system for handling a flow stream of condensate of steam, the condensate containing nitrite the process controlling the emission of nitrogen dioxide, and comprising substantially continuously introducing into the condensate an amount of an oxidizing biocide which substantially prevents the emission of nitrogen dioxide from the condensate handling system, said amount being substantially less than the stoichiometric amount which would be required to oxidize all the nitrite to nitrate and being of an amount which does not substantially inhibit the growth of organisms, selected from the group consisting of algae, fungi and bacteria, in said stream.

55. The process of claim 54 wherein further comprises the periodic introduction of a non-oxidizing biocide to reduce the amount of organisms to about 1 percent of the amount existing before the introduction of the non-oxidizing biocide.

56. The process of claim 55 wherein said oxidizing biocide is trichloro-isocyanuric acid, which is introduced into the condensate in the amount of less than about 2 percent of the stoichiometric amount which would be required to convert all the nitrite to a nitrate, said non-oxidizing biocide is isothiazalone, which is introduced into the condensate in the amount of between about 25 and about 200 PPMW, relative to the condensate, the periodic introduction is at intervals of between about 1 and about 4 weeks, and a corrosion inhibitor, comprising an inorganic phosphate passivator and scale dispersant, is added to the condensate in an amount between about 10 and about 50 PPMW relative to the condensate.

57. The process of claim 54 wherein the oxidizing biocide is selected from the group consisting of trichloro-isocyanuric acid and alkali and alkaline earth metal salts thereof, 1-bromo-3-chloro-5,5-dimethylhydantoin and other halogenated substituted hydantoins, and mixtures thereof.

* * * * *